United States Patent Office 2,832,810
Patented Apr. 29, 1958

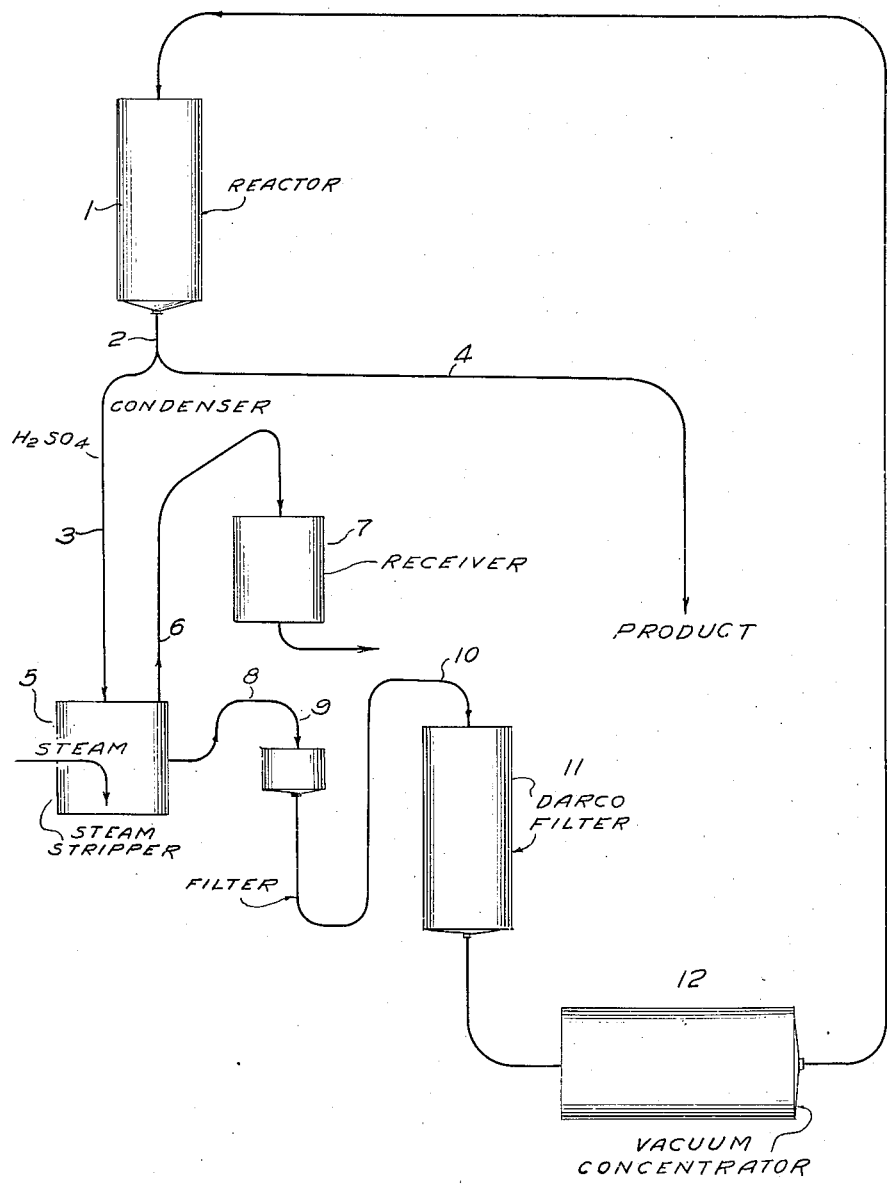
INVENTOR
EDWIN M. SMOLIN,

2,832,810

SEPARATION OF MERCURY FROM SULFURIC ACID

Edwin M. Smolin, Stamford, Conn., assignor to American Cyanamid Company, New York, N. Y., a corporation of Maine Application March 2, 1954, Serial No. 413,593

5 Claims. (Cl. 260—668)

This invention is directed to the separation of mercury from sulfuric acid containing mercury dispersed therein in finely divided form, and more particularly to the regeneration of mercury-sulfuric acid catalyst compositions for the separate recovery and reuse of the mercury and the sulfuric acid contained therein.

Dispersions of mercuric compounds such as mercuric sulfate, mercuric chloride, mercuric acetate and other mercuric salts of organic and inorganic acids in strong sulfuric acid, as well as mercuric oxide dispersions, have been used for many years in reactions involving the transformation of organic compounds. The earliest process employing such catalysts was probably the liquid phase oxidation of naphthalene to phthalic anhydride with strong sulfuric acid containing mercuric sulfate, which was developed in Germany before 1896 and is described in German Patent No. 91,202. Within recent years the use of such catalysts has attained wide recognition in condensation reactions between aromatic hydrocarbons such as benzene, toluene, xylene and other mono- and poly-alkyl substituted benzenes and unsaturated aliphatic hydrocarbons such as acetylene for the production of arylethanes, particularly 1,1-bis-(2- and 4-methylphenyl) ethane which is an important intermediate in the production of methylstyrene.

When organic reactions of the above type are carried out in the presence of sulfuric acid-mercury compound catalysts the activity of the catalyst is eventually reduced either by the formation of tarry and carbon-containing impurities therein or by continued dilution with water formed in the reactions, or both, and therefore requires regeneration. Attempts to regenerate such catalysts have presented extreme difficulties, however, and have not heretofore been successful. Simple fortification of the sulfuric acid with sulfur trioxide is not sufficient, as the carbon and tarry impurities would still be present. If attempts are made to reconcentrate the sulfuric acid directly without removal of the mercury a serious health hazard is involved. The present invention overcomes these difficulties by providing a relatively inexpensive and commercially feasible method for the substantially complete removal of the mercury from the sulfuric acid so that the acid can be purified and reconcentrated by commercially feasible processes.

Examination of samples of spent mercury-containing sulfuric acid catalysts, some of which had been used in condensing acetylene with toluene by the procedures hereinafter described, has shown that the mercury content is almost entirely present as metallic mercury distributed through the sulfuric acid in extremely finely divided form. The regeneration of such catalysts therefore requires the separation of finely divided metallic mercury from sulfuric acid containing tarry and carbonaceous impurities. The sulfuric acid is usually in the range of concentration of from about 85% $H_2SO_4$ up to about 94% $H_2SO_4$, based on the water present and not including the impurities. It will be evident, however, that the process of my invention is not necessarily limited to the treatment of concentrated spent sulfuric acids, but may be applied with equal success to substantially weaker acids of 50–80% sulfuric acid concentration or to even more dilute acids.

The method whereby mercury is separated and recovered from such catalysts in accordance with the invention is based on the injection of superheated steam. I have discovered that substantially the entire content of metallic mercury can be removed from its dispersion in sulfuric acid by a steam distillation process wherein the mercury-containing sulfuric acid is contacted with superheated steam and the resulting vapors are drawn off and condensed. Such a steam stripping procedure also breaks down and removes practically all of the dissolved sulfonated aromatic and aliphatic hydrocarbons such as toluene, xylenes, naphthalene and the like that may remain in the spent sulfuric acid catalyst, which is a further important advantage in recirculatory processes of the type hereinafter described.

After removing the metallic mercury and dissolved or suspended hydrocarbons by stripping with superheated steam the sulfuric acid is preferably filtered to remove non-volatile suspended impurities. This filtration may be carried out ta any desired temperature, but the acid is advantageously filtered at the temperature at which it leaves the stripper, which are usually within the range of about 150°–200° C. and close to its boiling point. A filter of glass cloth or other acid-resisting material such as a stainless steel screen coated with a diatomaceous earth filter aid is therefore advantageously used. When the sulfuric acid is filtered it is found that any remaining undecomposed mercury compounds such as mercuric salts or mercuric oxide are absorbed by the tars and carbonaceous residues in the acid and are retained on the filter, so that the filtered acid is substantially free from both metallic mercury and mercury compounds. The acid so purified can therefore be regenerated for reuse by fortification with sulfur trioxide or oleum or by any suitable concentration process, such as by the use of a vacuum concentrator or by blowing hot products of combustion through the acid in a standard drum-type concentrator.

The metallic mercury may be separated from the steam used for stripping by any suitable procedure. Preferably the vaporous mixture of steam, mercury and volatile hydrocarbons is condensed in a water-cooled receiver wherein the metallic mercury collects and is drawn off as a lower layer, the hydrocarbons forming an upper layer on top of the water.

By providing a commercially feasible process for the complete separation of mercury from spent sulfuric acid catalysts the invention permits recycling of the sulfuric acid and mercury to the organic reaction vessel. While the invention in its broader aspects is directed primarily to the separation of finely divided mercury from sulfuric acid by stripping with superheated steam, it will be evident that a recirculatory process wherein the recovered mercury and the reconcentrated sulfuric acid are combined and reused in an organic condensation reaction constitutes an important additional feature. Such a process is illustrated diagrammatically on the attached drawing, which is a flow sheet showing the sequence of steps of the process.

Referring to the drawing, the reactor 1 may be of any type suitable for carrying out the desired organic reaction such as the condensation of toluene with acetylene in the presence of strong sulfuric acid having a mercury catalyst dispersed therein. In such processes the reaction product ordinarily separates as an upper layer in the reaction vessel, permitting the spent sulfuric acid catalyst to be drawn off separately. The mercury-containing spent sulfuric acid is therefore removed first from the reactor through lines 2 and 3 and may be passed into a storage or surge tank that is not shown on the drawing, after which the 1,1-bis-(2- and 4-methylphenyl) ethane or other reaction product is withdrawn through lines 2 and 4.

The spent sulfuric acid catalyst is passed into a steam stripper 5, which is advantageously maintained at a temperature of about 150°–200° C. or higher, depending on the concentration of the spent sulfuric acid. Superheated steam, which is advantageously at a temperature of about 200°–300° C. or higher is contacted with the acid in this vessel. The stripping may be carried out batchwise by injecting the superheated steam into a body of the spent acid or a continuous process may be used wherein the superheated steam is contacted with a moving stream of the acid. The duration of the stripping process will depend on the quantity of mercury in the acid and also on the rate of steam introduction; in general, a weight of steam ranging from approximately ¾ to 1¼ of the weight of the acid is sufficient to remove all of the mercury from most spent sulfuric acid catalysts. The mercury, steam and hydrocarbons are removed from the stripper through line 6 and condensed into a receiver 7 from which the mercury is withdrawn as a lower layer.

During the steam stripping procedure the sulfuric acid usually becomes diluted to about 70–75% strength. This acid is preferably passed through a line 8 and a filter 9 which removes filterable coke and tarry impurities and also removes any undecomposed mercuric sulfate or other mercury compounds. The filtered acid may then be passed by line 10 into a column packed with activated carbon, which removes any colloidally dispersed carbon or carbonaceous impurities that may have passed through the filter 9. The clarified acid is then reconcentrated in a vacuum concentrator 12 to a strength of 85–95% sulfuric acid, after which it is suitable for reuse in the reactor 1.

The mercury recovered from the receiver 7 may be converted into mercuric sulfate, mercuric acetate, mercuric oxide or other catalytic compound of mercury by any suitable procedure and returned to the reactor 1 either in admixture with the sulfuric acid or by a separate addition.

The invention will be further illustrated by the following specific examples to which, however, it is not limited. In order to demonstrate the practical value of the invention, as well as to illustrate the type of spent catalysts which can be regenerated thereby, representative examples of condensation processes employing mercury-sulfuric acid catalysts are also included, it being understood that the invention in its broader aspects is not limited thereby.

EXAMPLE 1

Typical catalysts containing mercuric compounds dispersed in strong sulfuric acid as used in the condensation of toluene with acetylene are described in my copending application Serial No. 357,800, filed May 27, 1953, now U. S. Patent 2,734,928. Such catalysts usually contain one part by weight of mercury for each 150 to 2500 parts of 100% sulfuric acid. The following examples using a mercuric sulfate catalyst are taken from that application.

(a) Batch process

Into a mixture of 1288 parts of toluene and 175 parts of 95.5% sulfuric acid, the latter containing 0.113 part of mercuric sulfate, was added by means of a calibrated orifice 27.3 parts of acetylene (15% of theory) over a period of 35 minutes with vigorous stirring. An ice-water bath was used to cool the flask and maintain an internal temperature of 8–10° C. During the course of the run, 0.195 additional part of finely-divided mercuric sulfate was added. After acetylene addition was completed, the reaction mixture was stirred slowly for an additional 5 minutes and 200 parts of water was added slowly with stirring, keeping the temperature below 15° C. The organic layer was removed and distilled. A total of 1088 parts of toluene was recovered. A yield of 196 parts of 1,1-ditolylethane was obtained distilling at 150° C. at 10 mm. pressure. The yield based on toluene used up was 85.7% and based on acetylene charged was 88.6%.

(b) Continuous process

A single-stage continuous reaction was carried out by charging 360 parts of toluene, 47.8 parts of 98% sulfuric acid containing 0.078 part of dispersed mercuric sulfate calculated as parts of metallic mercury, and 20.7 parts of acetylene into the reactor. The reaction was then carried out continuously by bleeding from the reactor an amount of product equal to the amount of reactant introduced in the proportion above set forth. The yield of 1,1-ditolylethane was 125 parts which was 75% based on the toluene used up.

EXAMPLE 2

A sample of 7 lbs. of waste sulfuric acid as received from the reactor unit of Example 1 (a) was fed continuously to a 5-liter round-bottom glass flask fitted with a stirrer, a thermocouple, an inlet and an exhaust tube, and heated by a Glas-Col heating mantle. Flask temperature was maintained at 160° C. Steam at a temperature of 250°–300° C. was fed to the reactor at a rate of 4 lbs./hr. and acid at a rate of 4 lbs./hr. After all of the charge had been used up, the material collected at the exhaust end of the overhead condenser consisted of an upper layer of 1.0 lb. of toluene, and a lower layer of 5.4 lbs. of water. At the bottom of the water layer 4,200 g. of mercury was collected. This amounted to 80% of the input mercury to the synthesis unit. The remainder was in the organic product. The amount of mercury remaining in the sulfuric acid from the steam stripper was only a trace amount. As the acid was continuously removed from the stripper, it was filtered to remove the coke it contained, then filtered through a bed of Darco decolorizing charcoal and vacuum concentrated to 93%. After concentration, oleum was added to the 93% sulfuric acid to replace the amount lost during the above operations and to enrich the acid to approximately 95%. The metallic mercury was then available for conversion back to mercuric sulfate, the form in which it was added to the sulfuric acid for 1,1-ditolylethane synthesis.

What I claim is:

1. A method of removing mercury from a spent sulfuric acid recovered from organic synthesis employing a catalyst of at least 85% $H_2SO_4$ content having finely divided mercury dispersed therein which comprises stripping the mercury from said catalyst with superheated steam.

2. A method according to claim 1 wherein the spent catalyst is obtained from the condensation of acetylene with an aromatic hydrocarbon and contains carbonaceous impurities formed as by-products in said condensation.

3. A method of recovering a purified sulfuric acid suitable for use in organic condensation reactions from a spent sulfuric acid catalyst having tarry impurities and finely divided mercury dispersed therein which comprises stripping said spent catalyst with superheated steam and thereby removing the mercury, filtering out the tarry impurities, and concentrating the resulting purified sulfuric acid.

4. A method of recovering a purified sulfuric acid suitable for use in organic condensation reactions from a spent sulfuric acid catalyst having tarry impurities, finely divided carbon and finely divided mercury and mercury compounds dispersed therein which comprises stripping said spent catalyst with superheated steam and thereby removing the mercury, filtering the stripped acid and thereby removing the tarry impurities and mercury compounds, contacting the filtered acid with activated carbon and thereby removing the finely divided carbon, and concentrating the resulting purified acid.

5. In the production of mixtures of 1,1-bis-(2-methylphenyl) ethane and 1,1-bis-(4-methylphenyl) ethane by condensing acetylene with toluene in the presence of a sulfuric acid-mercuric salt catalyst containing sulfuric acid of at least 85% $H_2SO_4$ content the improvement which comprises drawing off spent mercury-containing sulfuric acid catalyst from the reaction, recovering the mercury therefrom by stripping it with superheated steam and condensing the resulting steam-mercury mixture, filtering the stripped sulfuric acid and thereby removing tarry impurities and mercury compounds, contacting the filtered acid with activated carbon and thereby removing finely divided carbon, concentrating the resulting purified sulfuric acid to its original strength, and returning the resulting acid to the condensation reaction.

References Cited in the file of this patent

UNITED STATES PATENTS

| | | |
|---|---|---|
| 279,840 | Stetefeldt | June 19, 1883 |
| 1,185,499 | Grunstein | May 30, 1916 |
| 1,960,348 | Pongratz | May 29, 1934 |
| 1,987,278 | Wilson | Jan. 8, 1935 |

OTHER REFERENCES

Riechert et al.: J. A. C. S., vol. 45 (1923), pages 3090–3091.

Reilly et al.: J. A. C. S., vol. 50 (1928), pages 2564–66.